United States Patent
Ernst et al.

(10) Patent No.: US 11,087,540 B2
(45) Date of Patent: *Aug. 10, 2021

(54) LIGHT-FIELD VIEWPOINT AND PIXEL CULLING FOR A HEAD MOUNTED DISPLAY DEVICE

(71) Applicant: Google LLC, Mountain View, CA (US)

(72) Inventors: Manfred Ernst, Mountain View, CA (US); Daniel Erickson, Mountain View, CA (US); Harrison McKenzie Chapter, Polo Alto, CA (US)

(73) Assignee: Google LLC, Mountain View, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/113,404

(22) Filed: Aug. 27, 2018

(65) Prior Publication Data

US 2019/0088023 A1    Mar. 21, 2019

Related U.S. Application Data

(63) Continuation of application No. 15/164,454, filed on May 25, 2016, now Pat. No. 10,089,788.

(51) Int. Cl.
| | |
|---|---|
| *G06T 19/00* | (2011.01) |
| *H04N 13/117* | (2018.01) |
| *G06T 15/20* | (2011.01) |
| *H04N 13/344* | (2018.01) |
| *H04N 13/366* | (2018.01) |
| *G02B 27/01* | (2006.01) |
| *G06T 3/40* | (2006.01) |
| *G06T 7/73* | (2017.01) |

(52) U.S. Cl.
CPC ........ *G06T 19/006* (2013.01); *G02B 27/0172* (2013.01); *G06T 3/4007* (2013.01); *G06T 7/73* (2017.01); *G06T 15/20* (2013.01); *H04N 13/117* (2018.05); *H04N 13/344* (2018.05); *H04N 13/366* (2018.05); *G06T 2200/21* (2013.01); *G06T 2207/10052* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 6,502,097 | B1 * | 12/2002 | Chan | ........................ G06F 16/40 |
| 6,642,924 | B1 * | 11/2003 | Kang | ...................... G06T 15/40 345/427 |

(Continued)

OTHER PUBLICATIONS

Office Action dated Jun. 10, 2021 for European Patent Application No. 16828812.4, 8 pages.

(Continued)

*Primary Examiner* — David H Chu

(57) ABSTRACT

An HMD device identifies a pose of the device and identifies a subset of a plurality of camera viewpoints of a light-field based on the pose. The HMD device interpolates image data of the light-field based on the pose and the subset of the plurality of camera viewpoints to generate an interpolated view; and displays at the HMD device an image based on the interpolated view. By interpolating based on the subset of camera viewpoints, the HMD device can reduce processing overhead and improve the user experience.

14 Claims, 4 Drawing Sheets

(56) References Cited

U.S. PATENT DOCUMENTS

| | | | | |
|---|---|---|---|---|
| 8,290,358 B1* | 10/2012 | Georgiev | ............... | G03B 35/10 396/326 |
| 8,749,620 B1* | 6/2014 | Knight | ................. | H04N 13/232 348/49 |
| 8,811,769 B1* | 8/2014 | Pitts | ........................ | G06T 3/40 382/275 |
| 8,988,317 B1* | 3/2015 | Liang | ..................... | G06T 15/00 345/32 |
| 2009/0268970 A1* | 10/2009 | Babacan | .............. | H04N 19/597 382/232 |
| 2010/0073400 A1* | 3/2010 | Wald | ....................... | G06T 15/06 345/619 |
| 2011/0129165 A1* | 6/2011 | Lim | .................. | G02B 27/0075 382/255 |
| 2012/0242855 A1* | 9/2012 | Nagasaka | .............. | H04N 5/225 348/222.1 |
| 2013/0222555 A1* | 8/2013 | Nagasaka | .......... | H04N 5/23229 348/50 |
| 2014/0078259 A1* | 3/2014 | Hiramoto | .......... | H01L 27/14627 348/46 |
| 2014/0146201 A1* | 5/2014 | Knight | .................... | H04N 9/07 348/231.99 |
| 2014/0267238 A1* | 9/2014 | Lum | ....................... | G06T 3/403 345/419 |
| 2014/0340389 A1* | 11/2014 | Lanman | ............. | G02B 27/0172 345/419 |
| 2015/0161427 A1* | 6/2015 | Guo | .................... | G06K 7/1443 235/462.08 |
| 2015/0208060 A1* | 7/2015 | Kim | ........................ | G06F 3/013 348/51 |
| 2016/0021355 A1* | 1/2016 | Alpaslan | .............. | H04N 13/106 348/43 |
| 2016/0073076 A1* | 3/2016 | Carroll | ..................... | H04N 9/04 348/242 |
| 2016/0105660 A1* | 4/2016 | Ito | ........................ | H04N 13/204 348/46 |
| 2016/0260258 A1* | 9/2016 | Lo | .......................... | G09G 5/363 |
| 2016/0313558 A1* | 10/2016 | Gutierrez | ........... | G02B 27/0176 |
| 2016/0330376 A1* | 11/2016 | Debevec | .............. | F16M 11/242 |
| 2017/0127051 A1* | 5/2017 | Chavez | ................ | H04N 13/332 |
| 2017/0154460 A1* | 6/2017 | Hu | .......................... | G06F 3/012 |

OTHER PUBLICATIONS

Inamoto, Naho, et al., "Free Viewpoint Video Synthesis and Presentation of Sporting Events for Mixed Reality Entertainment", Advances in Computer Entertainment Technology, Jun. 3, 2004, 9 pages.

Isaksen, Aaron, et al., "Dynamically Reparameterized Light Fields", The 27th International Conference on Computer Graphics and Interactive Techniques, Jul. 2000, 10 pages.

* cited by examiner

LIGHT-FIELD VIEWPOINT AND PIXEL CULLING FOR A HEAD MOUNTED DISPLAY DEVICE

The presentation application is a continuation application of U.S. patent application Ser. No. 15/164,454, entitled "LIGHT-FIELD VIEWPOINT AND PIXEL CULLING FOR A HEAD MOUNTED DISPLAY DEVICE" and filed on May 25, 2016, the entirety of which is incorporated by reference herein.

BACKGROUND

Field of the Disclosure

The present disclosure relates generally to head mounted display (HMD) devices and more particularly to using light-fields at an HMD device.

Description of the Related Art

Virtual reality (VR) and augmented reality (AR) systems often employ an HMD device to present VR or AR content to a user. For example, a VR application executing at a processor of the HMD device can generate images based on a pose of the HMD device and present the generated images to the user via one or more display panels of the HMD device, thereby giving the user the experience of moving or looking around a virtual space. In some applications, limitations on processing speed and other system resources mean that the VR application does not generate each image from scratch, but instead employs stored images to represent at least a portion of the virtual space. To generate images to support presentation of a virtual space, some VR systems employ a light-field, wherein an array of cameras collectively record images of a scene. The resulting set of images indicates both the intensity and direction of light at each point in an image plane. This allows the VR application to project new viewpoints of the scene captured by the camera array based on changes in the pose of the HMD device, thereby giving the user the impression that they are looking around the virtual space. However, projecting such viewpoints with sufficient speed to match the changes in pose can require extensive processor resources, which can negatively impact the form factor of the HMD device, such as by requiring the HMD device to be tethered to a large computer system. Alternatively, the HMD device can employ relatively low-resolution images for the light-field, but the resulting quality of the presented virtual space can negatively impact the user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for culling light-field camera viewpoints and image pixels based on a pose of an HMD device, thereby reducing the amount of data to be processed at the HMD device to project new viewpoints in a virtual space. The HMD device identifies a viewing frustum in the virtual space based on the pose of the HMD device, and further identifies an intersection of the viewing frustum with a camera plane of the light-field. The HMD device culls at least some of the camera viewpoints that lie outside of a perimeter of a polygon defined by the intersection, and selects stored images associated with the remaining subset of camera viewpoints. The HMD device then identifies an intersection of rays, relative to the culled camera viewpoints, with image planes of the selected images and culls at least some of the pixels of the selected images that lie outside a perimeter of a polygon defined by the corresponding intersection. The HMD device employs the remaining subset of pixels to generate at least one image for display representative of a viewpoint in the virtual space corresponding to the pose of the HMD device.

Figure 1:
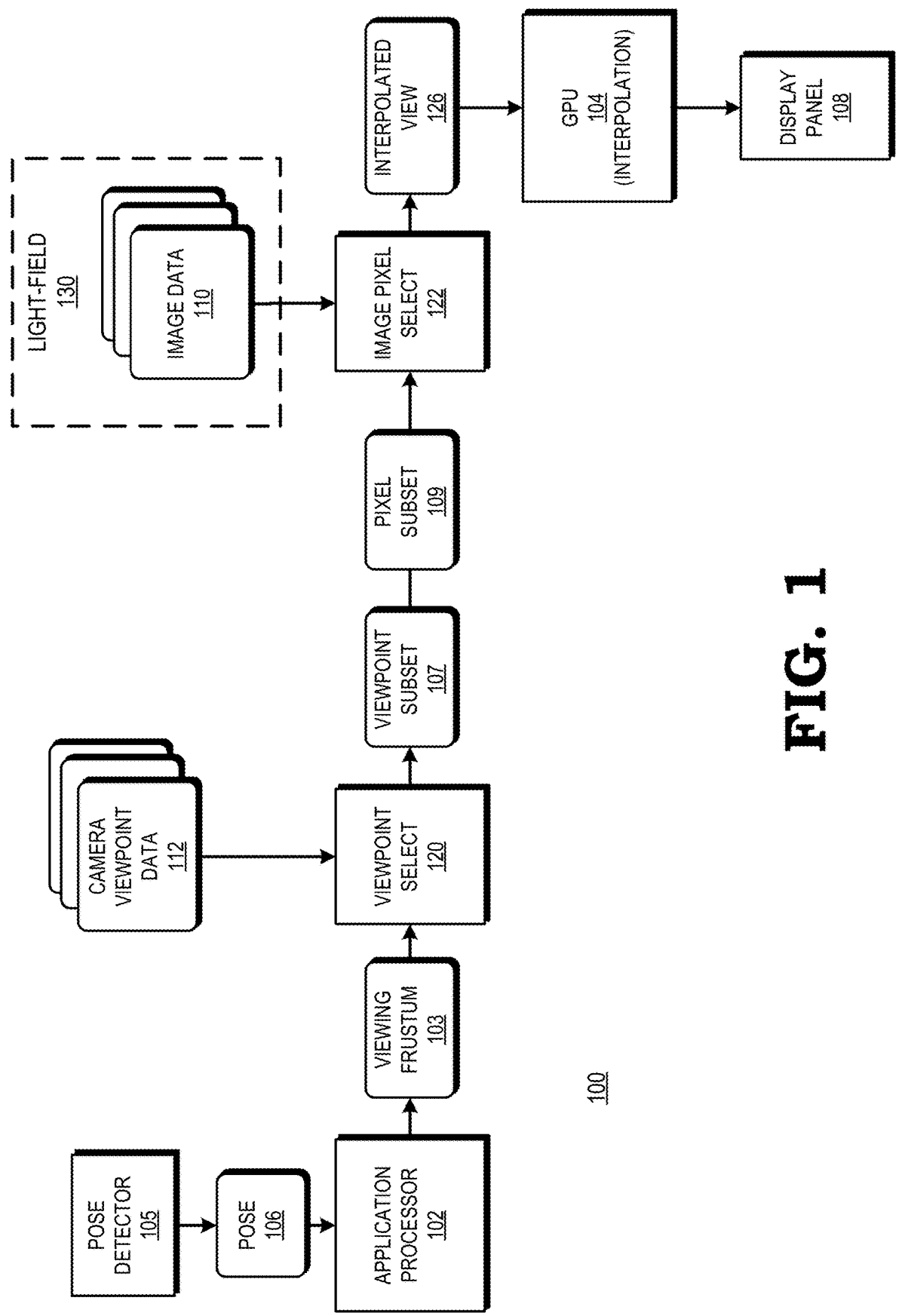
FIG. 1 is a block diagram of an HMD device that culls light-field viewpoints and image pixels based on a pose of the HMD device in accordance with some embodiments.

FIG. 1 illustrates a block diagram of an HMD device 100 that culls light-field viewpoints and image pixels for interpolation of viewpoints in accordance with some embodiments. In at least one embodiment, the HMD device 100 is at least partially disposed in a housing or other enclosure (not shown) having a form factor that supports attachment to a user's head, such as a goggles or glasses form factor. In particular, enclosure is formed such that, when it is attached to the user's head, the form factor facilitates display of imagery to the user's eyes. In other embodiments, the HMD device 100 may be a tablet, smartphone, or other electronic device that is not physically attached to the user's head via a mechanical attachment, but instead is held by the user in a relatively fixed position with respect to the user's eyes.

The HMD device 100 is generally configured to provide virtual reality (VR) or augmented reality (AR) content to the user. For purposes of description, the term VR content is used herein to refer either or both of VR content or AR content. In the example of FIG. 1, the HMD device 100 generates VR content based on a light-field 130. As is understood in the art, the light-field 130 is data representing the amount of light flowing in different directions through points in space of a scene. The light-field 130 is generated by capturing images at each camera of an array of cameras focused on the scene. For purposes of description, it is assumed that the array of cameras are arranged in a two dimensional plane, referred to herein as the "camera plane." However, it will be appreciated that in other embodiments the camera array can be arranged in a non-planar configuration. Further, as used herein a "viewpoint" of the light-field refers to a point in the light-field from which the scene can be viewed. Thus, because each of the images generated by a camera in the array is a view of the scene, the position of each camera in the array corresponds to a viewpoint, referred to herein as a "camera viewpoint" in the light-field 130. Further, using conventional light-field interpolation techniques, the HMD device 100 can interpolate between camera viewpoints to generate new viewpoints, referred to herein as "interpolated viewpoints." This allows the HMD device 100 to generate new views of the scene and present corresponding images of a virtual scene to a user in response to the user moving the HMD device 100. The HMD device 100 thus gives the user the impression of moving around the presented virtual scene.

To support provision of the virtual scene, the HMD device 100 includes an application processor 102, a graphics processing unit (GPU) 104, a pose detector 105, and a display panel 108. The display panel 108 is a display device such as a liquid crystal display (LCD), light-emitting diode (LED) display, and the like, and is generally configured to display images generated at the HMD device 100 to the user. In at least one embodiment, the HMD device 100 includes more than one display panel. For example, the HMD device 100 can include two display panels such that when the HMD device 100 is worn properly, each of the two display panels is oriented to display images to a different eye, thereby supporting presentation of stereoscopic three-dimensional imagery to the user.

The pose detector 105 includes one or more inertial measurement units (IMUs) having one or more accelerometers, gyroscopes, and other motion and position sensors. Based on information generated by these sensors, the pose detector 105 identifies a pose 106 of the HMD device 100, indicating both a position and orientation of the HMD device 100 in a frame of reference. In at least one embodiment, the pose detector 105 can augment the pose 106 based on features identified in imagery captured by the HMD device 100. Further, the pose detector 105 can periodically update the pose 106 as the user moves, such that the pose 106 always represents the current or relatively recent position and orientation of the HMD device 100.

The application processor 102 includes one or more processing cores configured to execute sets of instructions organized as computer programs, including at least one VR application. The VR application, when executed at the application processor 102, is generally configured to identify, based on the pose 106, a pose of the user in a virtual space, wherein the virtual space is based at least in part on the light-field 130. For example, in at least one embodiment, in response an initialization of the VR application, the application identifies the pose 106 as corresponding to the user having a pose at the origin of a frame of reference in the virtual space. In response to changes in the pose 106, the VR application makes commensurate changes in the pose of the user in the virtual space. For each pose of the user in the virtual space, and therefore for each corresponding pose 106 of the HMD device 100, the VR application generates a viewing frustum 103, indicating the area viewed by the user in the virtual space. In at least one embodiment, the VR application generates the viewing frustum 103 based on identifying a solid, such as a cone or pyramid, that lies between a near plane in the virtual space (that is, a plane relatively near the position of the user in the virtual space) and a far plane (that is, a plane relatively far from the position of the user in the virtual space) parallel to the near plane.

The GPU 104 is generally configured to generate images for display at the display panel 108 by interpolating viewpoints of the light-field 130 based on the viewing frustum 103. In particular, as the viewing frustum 103 changes based on changes in the pose 106, the GPU 104 interpolates image data 110 of the light-field 130 to generate interpolated viewpoints corresponding to the viewing frustum 103. For example, based on the viewing frustum 103 the GPU 104 can identify the viewpoint of the user (referred to herein as the "user viewpoint") relative to the camera viewpoints of the light-field 130. In response to identifying that the user viewpoint corresponds to a camera viewpoint, the GPU 104 selects the image corresponding to the identified camera viewpoint and displays the selected image at the display panel 108. However in response to identifying that the user viewpoint does not correspond to a camera viewpoint, the GPU 104 identifies image data for each of the camera viewpoints closest to the user viewpoint, identifies pixel correspondences between the identified images, and interpolates pixel values based on the pixel correspondences, thereby generating an interpolated view 126. It will be appreciated that the interpolated view 126 can be generated using other interpolation techniques that do not require identifying pixel correspondences. The interpolated view 126 is an image representing the view of the virtual scene at the user viewpoint, as interpolated from the camera viewpoints of the light-field 130. The GPU 104 provides the interpolated view to the display panel 108, thereby giving the user the impression of "looking around" the virtual space.

For large or complex scenes the light-field 130 can include a large amount of image data 110. In these scenarios, the size of image data 110 is such that it is difficult or impossible for the GPU 104 to quickly interpolate viewpoints of the light-field 130, thereby leading to a poor user experience. Accordingly, to reduce the amount of data used by the GPU 104 to generate the interpolated view 126, the HMD device 100 includes a viewpoint select module 120 and an image pixel select module 122 that together cull pixel data from the light-field 130 before it is provided to the GPU 104, thereby reducing processing overhead at the GPU 104 and improving the user experience.

The viewpoint select module 120 is configured to receive camera viewpoint data 112, which represents the set of camera viewpoints for the light-field 130. In at least one embodiment, the camera viewpoint data 112 indicates each camera viewpoint as a coordinate in at least two dimensions representing the relative location of each camera viewpoint in the camera plane. The viewpoint select module 120 identifies an intersection of the viewing frustum 103 with the camera plane and identifies a viewpoint subset 107 based on the intersection. As used herein, a subset is defined as a set including some, but not all, of the members of its parent set. Thus, the viewpoint subset 107 includes some, but not all, of the camera viewpoints of the light-field 130.

The viewpoint select module 120 selects the viewpoint subset 107 to include only those camera viewpoints that could be used, based on the viewing frustum 103, to calculate an interpolated viewpoint. That is, for a given instance of the viewing frustum 103, some camera viewpoints, referred to for purposes of description as "non-contributing" viewpoints, will be located such that they will not be used in calculating any interpolated view. The viewpoint select module 120 omits these non-contributing viewpoints from the viewpoint subset 107, thereby reducing the amount of data to be used by the GPU 104 in generating the interpolated view 126.

In at least one embodiment, the viewpoint select module 120 selects the viewpoint subset 107 by first dividing the camera plane into a grid of cells, with each camera at the intersection of the grid lines that form the grid. The viewpoint select module 120 then identifies a polygon formed by the intersection of the viewing frustum 103 with the camera plane and identifies cells of the camera plane having at least a threshold amount of their corresponding areas that lies within the identified polygon, wherein the threshold amount is programmable. For example, the threshold amount may be set or programmed to be zero, such that the viewpoint select module 120 selects for the viewpoint subset 107 any viewpoint corresponding to camera adjacent to a cell that has any portion of its area within the perimeter of the polygon.

In at least one embodiment, the viewpoint select module 120 identifies the cells for the viewpoint subset using a conservative rasterization algorithm. For example, the viewpoint select module 120 can identify edge functions for each edge of the polygon, evaluate each of the edge functions to identify any cells that intersect the edges of the polygon or that lie entirely within the perimeter of the polygon, and include cameras that are adjacent to the identified cells in the viewpoint subset 107. The viewpoint select module 120 thus includes in the viewpoint subset 107 those camera viewpoints that are potential candidates to generate the interpolated view 126.

The image pixel select module 122 is configured to select from the image data 110 those images corresponding to the camera viewpoints in the viewpoint subset 107 and for each selected image identifies a subset of pixels that are potential candidates to generate the interpolated view 126. That is, for a given image, some pixels of the image (referred to herein as "non-contributing" pixels) will not be used to generate any possible interpolated view. The image pixel select module 122 removes all non-contributing pixels from the image data 110 to generate a pixel subset 109 for provision to the GPU 104. Thus, the image pixel select module 122 provides only a subset of the pixels of the light-field 130 to the GPU 104 for interpolation, thereby improving processing efficiency and in turn improving the user experience.

In at least one embodiment, to generate the pixel subset 109 the image pixel select module 122 employs a conservative rasterization algorithm in analogous fashion to the viewpoint select module 120. In particular, the image pixel select module 122 initially selects from the image data 110 the images corresponding to the viewpoints of the viewpoint subset 107. For each selected image the image pixel select module 122 divides the image into a grid of cells, with different pixels within each cell. The image pixel select module 122 then traces rays from the user viewpoint through the camera viewpoints in the camera plane adjacent to the camera viewpoint corresponding to the selected image, and identifies a polygon formed by the intersection of the rays with the image plane of the image. The image pixel select module 122 next employs a conservative rasterization algorithm to identify those cells that have at least a portion of their area inside the perimeter of the polygon, and places the pixels of the identified cells in the pixel subset 109. By employing conservative rasterization for each image corresponding to a viewpoint of the viewpoint subset 107, the image pixel select module 122 includes in the pixel subset 109 only those pixels that may be used by the GPU 104 to generate the interpolated view 126, thus reducing the amount of pixel data to be managed at the GPU 104 and improving the efficiency with which the GPU 104 generates the interpolated view 126.

Figure 2:
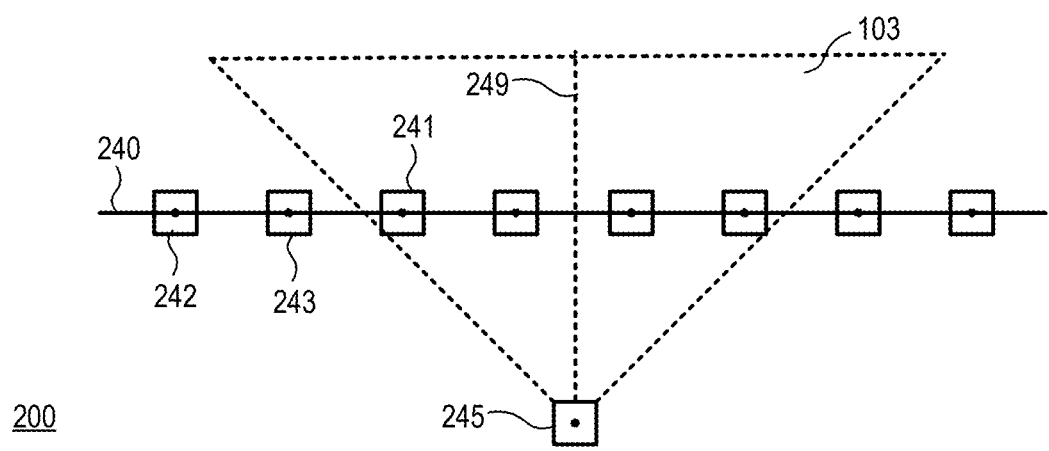
FIG. 2 is a diagram illustrating an example of light-field viewpoints at the HMD device of FIG. 1 in accordance with some embodiments.

FIG. 2 illustrates a diagram 200 depicting an example of selecting viewpoints at the HMD device 100 based on a viewing frustum in accordance with some embodiments. The diagram 200 depicts a top-down view of a camera plane 240, corresponding to the camera plane of the light-field 130 (FIG. 1). Along the camera plane are a plurality of camera viewpoints, such as camera viewpoints 241, 242, and 243. Each of the camera viewpoints corresponds to the location of a camera in a camera array that captured imagery of the scene upon which the VR experience portrayed at the HMD device 100 is based.

The diagram 200 also depicts a user viewpoint 245 as identified by the application processor 102 based on the pose 106. In at least one embodiment, the VR application executing at the application processor identifies the user viewpoint 245, relative to the camera plane 240 as follows: in response to an initialization event, such as a user starting the application, the VR application initializes a frame of reference for the VR space and places the camera plane 240 at a specified initial location in the frame of reference. In addition, the VR application places the user viewpoint 245 at a specified pose (position and orientation) relative to the camera plane 240. As the pose of the HMD changes, as indicated by changes in the pose 106, the application processor 102 effects commensurate changes in the user viewpoint 245 relative to the camera plane 240.

In the depicted example, the user viewpoint 245 forms a pyramidal viewing frustum 103, corresponding to the viewing frustum 103 of FIG. 1 and having a centerline 249 representing the center of the user's view in the virtual space. As the pose 106 of the HMD device 100 changes, the application processor 102 commensurately changes the position and orientation of the viewing frustum 103 relative to the camera plane 240.

As described above with respect to FIG. 1, the HMD device 100 is generally configured to generate images for display from the light-field 130 based on the position and orientation of the viewing frustum 103. The application processor 102 receives the pose 106 indicating the current pose of the HMD device 100 and based on the pose 106 generates the viewing frustum 103. The viewpoint select module 120 identifies, based on the camera viewpoint data 112, if the user viewpoint 245 corresponds to one of the camera viewpoints. If so, then no interpolation is necessary and the viewpoint select module 120 selects for the viewpoint subset 107 only the identified camera viewpoint corresponding to the user viewpoint 245. The image pixel select module selects the image data corresponding to the selected camera viewpoint and provides it the GPU 104 for display at the display panel 108.

In the depicted example of FIG. 2, the user viewpoint 245 does not correspond to a camera viewpoint, indicating that the GPU 104 must generate an interpolated view 126. Accordingly, for a scenario such as the one illustrated in diagram 200, the viewpoint select module 120 selects for the viewpoint subset 107 the camera viewpoints that lie within the viewing frustum 103, such as the camera viewpoint 241, as well as camera viewpoints adjacent to the camera viewpoints that lie within the viewing frustum 103, such as camera viewpoint 243. The viewpoint select module 120 excludes from the viewpoint subset 107 the camera viewpoints, such as camera viewpoint 242, which do not lie within the viewing frustum 103 or are adjacent to camera viewpoints that lie within the viewing frustum 103.

Figure 3:
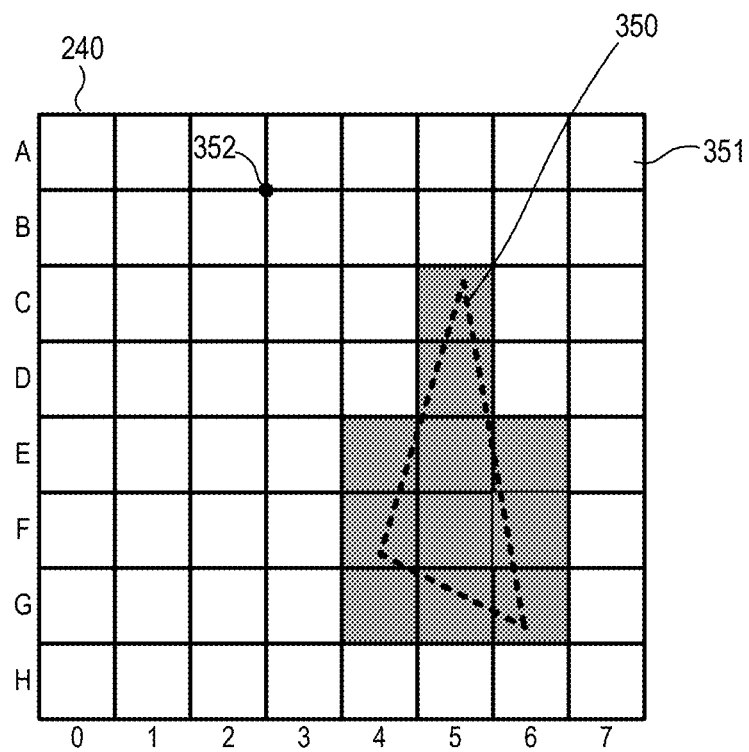
FIG. 3 is a diagram illustrating an example of the HMD device of FIG. 1 employing conservative rasterization to cull light-field viewpoints and image pixels in accordance with some embodiments.

FIG. 3 illustrates a diagram 300 depicting an example of the viewpoint select module 120 identifying camera viewpoints for the viewpoint subset 107 in accordance with some embodiments. Diagram 300 illustrates an orthogonal view of the camera plane 240, wherein the viewpoint select module 120 has divided the camera plane 240 into a plurality of cells (e.g., cell 351) by creating a set of intersecting grid lines, with each intersection of grid lines (e.g. intersection 352) corresponding to the location of a camera viewpoint in the camera plane 240. In the depicted example, the grid has eight rows, designated A-H, and eight columns, designated 0-7 so that each cell can be identified by its row and column number. Thus, for example, cell 351 is located at position A-7 in the top right corner of the camera plane 240. As used herein, a camera viewpoint is adjacent to a cell if it is at the intersection of the gridlines that form the cell—that is, is located at the corner of the cell. Thus, the camera viewpoint at intersection 352 is adjacent to the cells A2, A3, B2, and B3.

Diagram 300 also illustrates a polygon 350, representing the intersection of the viewing frustum 103 with the camera plane 240. To select camera viewpoints for the viewpoint subset 107, the viewpoint select module 120 employs a conservative rasterization algorithm to identify the cells that have a least a portion of their area within the perimeter of the polygon 350. In the example of diagram 300 these cells are colored in gray, and include the cells C-5, D-5, E-4, E-5, E-6, F-4, F-5, F-6, G-4, G-5, and G-6. The viewpoint select module 120 includes in the viewpoint subset 107 all of the camera viewpoints for cameras adjacent to the identified cells. Thus, for the depicted example, the viewpoint select module 120 includes in the viewpoint subset 107 the viewpoints for the cameras located at the corners of the following cells: C-5, C-6, D-5, E-4, E-5, E-6, F-4, F-5, F-6, G-4, G-5, and G-6.

Figure 4:
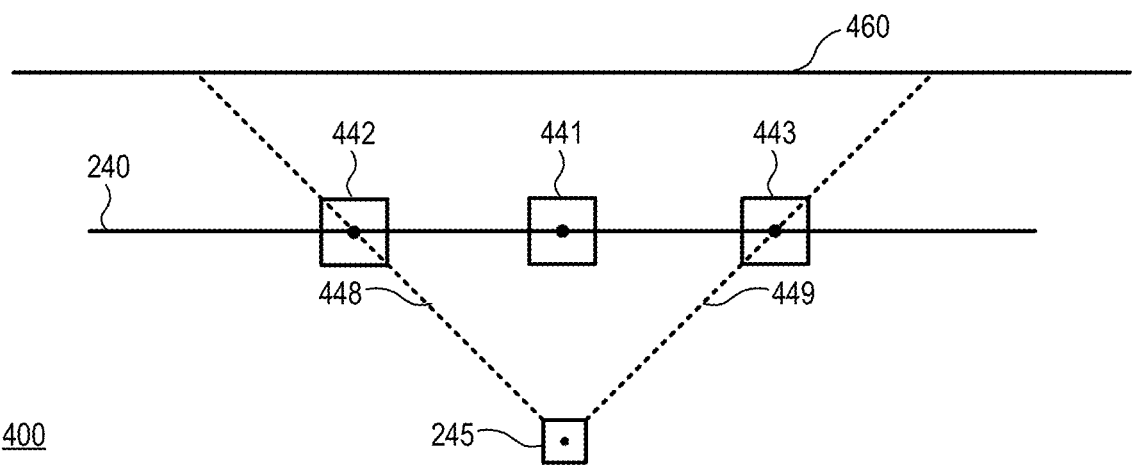
FIG. 4 is a diagram illustrating an example of identifying a polygon for culling image pixels at the HMD device of FIG. 1 in accordance with some embodiments.

FIG. 4 illustrates a diagram 400 depicting an example of identifying a polygon to cull pixels from an image at the HMD device 100 in accordance with some embodiments. The diagram 400 depicts a top-down view of a portion of the camera plane 240, corresponding to the camera plane of the light-field 130 (FIG. 1). The depicted portion of the camera plane 240 includes a plurality of camera viewpoints, such as camera viewpoints 441. The diagram 200 also depicts the user viewpoint 245 and an image plane 460, corresponding to the image plane for the image captured by the camera at camera viewpoint 441.

To identify a polygon for culling of pixels of the image corresponding to the image plane 460, the image pixel select module 122 traces rays (e.g. ray 448 and ray 449) from the user viewpoint 245 to the image plane 460, wherein each ray passes through a different camera viewpoint adjacent to the camera viewpoint 441. Thus, the image pixel select module 122 traces the ray 448 by placing its origin at user viewpoint 245, passing the ray through the camera viewpoint 442 (adjacent to the camera viewpoint 441), and having an endpoint at the intersection of the traced ray with the image plane 460. Similarly, the image pixel select module 122 traces the ray 449 by placing its origin at user viewpoint 245, passing the ray through the camera viewpoint 443 (adjacent to the camera viewpoint 441), and having an endpoint at the intersection of the traced ray with the image plane 460. The image pixel select module 122 identifies a polygon formed by the intersection of all of the traced rays with the image plane 460, and based on the polygon employs a conservative rasterization algorithm to cull pixels from the image corresponding to image plane 460.

Figure 5:
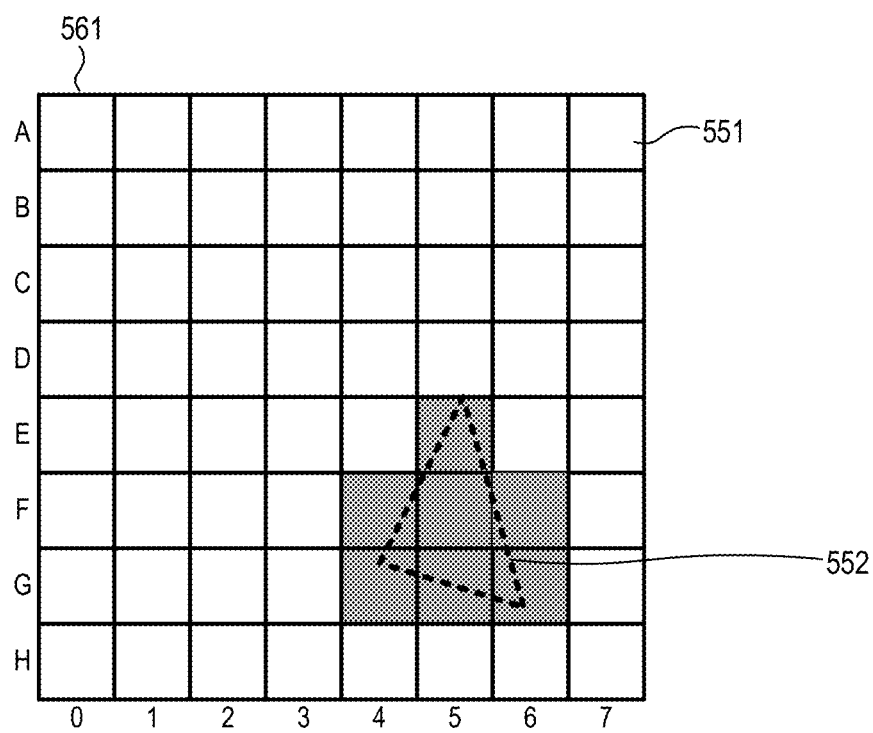
FIG. 5 is a diagram illustrating an example of the HMD device of FIG. 1 employing conservative rasterization to cull image pixels in accordance with some embodiments.

FIG. 5 illustrates a diagram 500 depicting an example of the image pixel select module identifying pixels to be included in the pixel subset 109 based on a polygon formed according to the example of FIG. 4, in accordance with at least one embodiment. Diagram 500 includes an image 561, which for purposes of description is the image corresponding to image plane 460 (FIG. 4). In the depicted example, the image pixel select module 122 has divided the image 561 into a plurality of cells (e.g. cell 551), with each cell including a plurality of pixels of the image. Diagram 500 also illustrates a polygon 552, representing the polygon formed by the process described with respect to FIG. 4. That is, the polygon 552 is the polygon formed by the intersections of the rays traced through the camera viewpoints adjacent to the camera viewpoint 441 and the image plane 460. The image pixel select module 122 uses a conservative rasterization algorithm to identify the cells have at least a portion of their area within the perimeter of the polygon 552 and places the identified pixels in the pixel subset 109. The image pixel select module 122 repeats the process described with respect to FIGS. 4 and 5 for each camera viewpoint included in the viewpoint subset 107. The GPU 104 then uses only the pixel subset 109 to generate the interpolated view 126.

Figure 6:
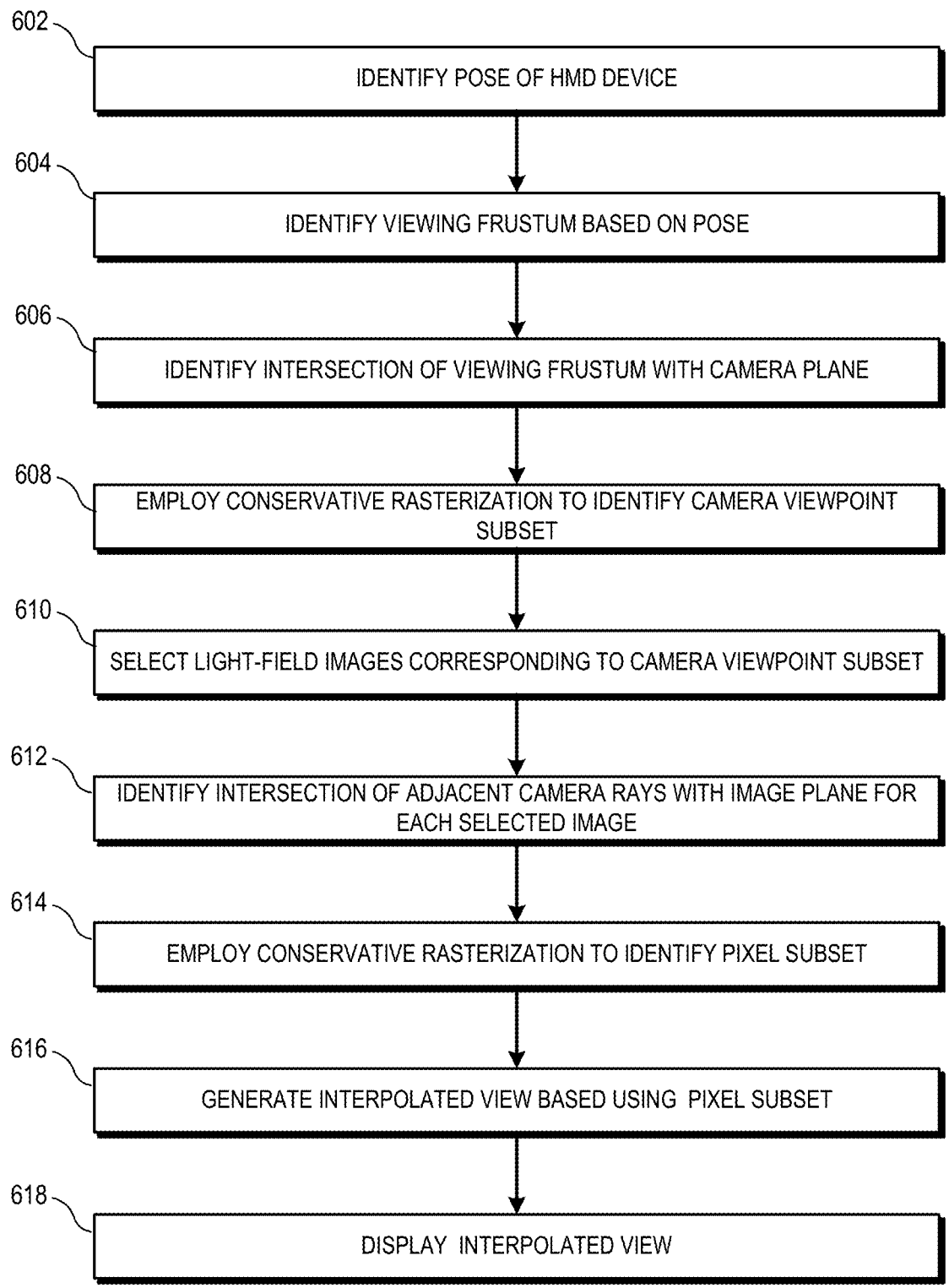
FIG. 6 is a flow diagram of a method of culling light-field viewpoints and image pixels to generate an interpolated view at an HMD device in accordance with some embodiments.

FIG. 6 is a flow diagram of a method 600 of culling camera viewpoints and image pixels at an HMD device in accordance with at least one embodiment. For purposes of description, the method 600 will be described with respect to an example implementation at the HMD device 100 of FIG. 1. At block 602 the pose detector 105 detects a pose of the HMD device 100 and indicates the pose 106 to the application processor 102. At block 404 the application processor 102 identifies the viewing frustum 103 based on the pose 106 and provides it to the viewpoint select module 120.

At block 606 the viewpoint select module 120 identifies an intersection of the viewing frustum 103 with the camera plane of the light-field 130 and further identifies a polygon formed by this intersection. At block 608 the viewpoint select module 120 employs the identified polygon and a conservative rasterization algorithm to select the camera viewpoints for the viewpoint subset 107. At block 610 the image pixel select module 122 selects from the image data 110 images corresponding to the camera viewpoints included in the viewpoint subset 107. At block 612 the image pixel select module 122 traces, for each camera viewpoint corresponding to a camera viewpoint of the viewpoint subset 107, rays through the adjacent camera viewpoints. The image pixel select module 122 identifies, a polygon formed by the intersection of the rays with the image plane. At block 614 the image pixel select module 122 employs the identified polygons and a conservative rasterization algorithm to identify pixels from the selected images for inclusion in the pixel subset 109. At block 616 the GPU 104 uses the pixels in the pixel subset 109 to generate the interpolated view 126, which at block 618 is displayed at the display panel 108.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   identifying a pose of a head mounted display (HMD) device;
   identifying, at the HMD device and based on the pose, a plurality of images associated with a light-field representing a scene to be displayed;
   identifying, at the HMD device and based on the pose, a subset of a plurality of camera viewpoints of the light-field;
   for each of the plurality of images selecting, based on the pose, non-contributing pixels within each image and removing the non-contributing pixels from image data of the light-field to generate a subset of pixels of the plurality of images;
   interpolating at the HMD device, the image data of the light-field based on the pose and the subset of pixels to generate an interpolated view; and
   displaying at the HMD device an image based on the interpolated view.

2. The method of claim 1, wherein generating the subset of pixels comprises:
   selecting a camera viewpoint from the subset of the plurality of camera viewpoints of the light-field;
   tracing a plurality of rays through camera viewpoints of the light-field adjacent to the selected camera viewpoint; and
   identifying the subset of pixels based on the plurality of rays.

3. The method of claim 2, wherein generating the subset of pixels further comprises:
   identifying a polygon based on an intersection of the plurality of rays with an image plane of an image corresponding to the selected camera viewpoint;
   identifying a plurality of cells for the image; and
   identifying the subset of pixels to include cells of the plurality of cells having at least a portion of their area within a perimeter of the polygon.

4. The method of claim 3, wherein identifying the subset of pixels further comprises:
   applying a conservative rasterization process to the polygon and the plurality of cells to identifying the cells having at least a portion of their area within the perimeter of the polygon.

5. The method of claim 1, further comprising:
   interpolating at the HMD device, image data of the light-field based on the pose and the subset of the plurality of camera viewpoints to generate the interpolated view.

6. The method of claim 5, wherein identifying the subset of the plurality of camera viewpoints further comprises:
   identifying a plurality of cells of a camera plane, each of the plurality of cells associated with a corresponding one of the plurality of camera viewpoints;
   selecting a subset of the plurality of cells to include cells having an area at least partially within a perimeter of the intersection of a viewing frustum and the camera plane; and
   identifying the subset of the plurality of camera viewpoints based on the selected subset of the plurality of cells.

7. The method of claim 6, wherein selecting the subset of the plurality of cells comprises selecting the subset of the plurality of cells based on a conservative rasterization process applied to the intersection of the viewing frustum and the camera plane.

8. A head mounted display (HMD) device comprising:
   a pose detector configured to identify a pose of a head mounted display (HMD) device;
   a viewpoint select module configured to identify, based on the pose, a plurality of images associated with a light-field representing a scene to be displayed and a subset of a plurality of camera viewpoints of the light-field;
   an image pixel select module configured to select for each of the plurality of images, based on the pose, a plurality of non-contributing pixels within each image and to remove the plurality of non-contributing pixels from image data of the light-field to generate a subset of pixels of the plurality of images;

a graphics processing unit (GPU) configured to interpolate the image data of the light-field based on the pose and the subset of pixels to generate an interpolated view; and a display panel configured to display an image based on the interpolated view.

9. The HMD device of claim 8, further comprising:

an application processor to select a camera viewpoint from the plurality of camera viewpoints of the light-field and to trace a plurality of rays through camera viewpoints of the light-field adjacent to the selected camera viewpoint; and wherein the image pixel select module is configured to generate the subset of pixels based on the plurality of rays.

10. The HMD device of claim 9, wherein the viewpoint select module is to:

identify a polygon based on an intersection of the plurality of rays with an image plane of an image corresponding to the selected camera viewpoint;

identify a plurality of cells for the image; and identify the subset of pixels to include cells of the plurality of cells having at least a portion of their area within a perimeter of the polygon.

11. The HMD device of claim 10, wherein the image pixel select module is to generate the subset of pixels by:

applying a conservative rasterization process to the polygon and the plurality of cells to identifying the cells having at least a portion of their area within the perimeter of the polygon.

12. The HMD device of claim 8, wherein the GPU is configured to interpolate image data of the light-field based on the pose and the subset of the plurality of camera viewpoints to generate the interpolated view.

13. The HMD device of claim 12, wherein the viewpoint select module is configured to identify a subset of the plurality of camera viewpoints of the light-field by:

identifying a plurality of cells of a camera plane, each of the plurality of cells associated with a corresponding one of the plurality of camera viewpoints;

selecting a subset of the plurality of cells to include cells having an area at least partially within a perimeter of the intersection of a viewing frustum and the camera plane; and identifying the subset of the plurality of camera viewpoints based on the selected subset of the plurality of cells.

14. The HMD device of claim 13, wherein the viewpoint select module is configured to select the subset of the plurality of cells based on a conservative rasterization process applied to the intersection of the viewing frustum and the camera plane.

* * * * *